(12) United States Patent
Takehara et al.

(10) Patent No.: US 6,866,922 B2
(45) Date of Patent: Mar. 15, 2005

(54) POWER TRANSMISSION BELT

(75) Inventors: Takeshi Takehara, Hyogo (JP); Hitoshi Hasaka, Kobe (JP); Takeshi Kimura, Kobe (JP); Yasutsugu Kunihiro, Hyogo (JP); Toshimichi Takada, Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 44 days.

(21) Appl. No.: 10/400,274

(22) Filed: Mar. 27, 2003

(65) Prior Publication Data

US 2004/0005447 A1 Jan. 8, 2004

(30) Foreign Application Priority Data

Mar. 28, 2002 (JP) ........................................ 2002-091153

(51) Int. Cl.[7] .............................................. B32B 25/10
(52) U.S. Cl. .................... 428/295.1; 428/375; 428/364; 428/367; 428/396; 428/332; 428/401; 474/161; 474/268; 474/263; 474/271
(58) Field of Search ................................. 428/375, 364, 428/367, 396, 401, 332, 295.1; 474/161, 266, 268, 263, 207, 271

(56) References Cited

U.S. PATENT DOCUMENTS 5,891,561 A * 4/1999 Kinoshita et al. ......... 428/295.1

FOREIGN PATENT DOCUMENTS

| JP | 3113599 | 5/1991 |
|----|---------|--------|
| JP | B-5-63656 | 9/1993 |
| JP | B-7-81609 | 9/1995 |

* cited by examiner

Primary Examiner—Merrick Dixon
(74) Attorney, Agent, or Firm—Wood, Phillips, Katz, Clark & Mortimer

(57) ABSTRACT

A power transmission belt having a body with a length, a width, an inside, and an outside. The body includes a rubber composition. The body further has a plurality of short fibers in the rubber composition. The plurality of short fibers may include a plurality of poly-p-phenylene benzobisoxazole fibers.

33 Claims, 3 Drawing Sheets

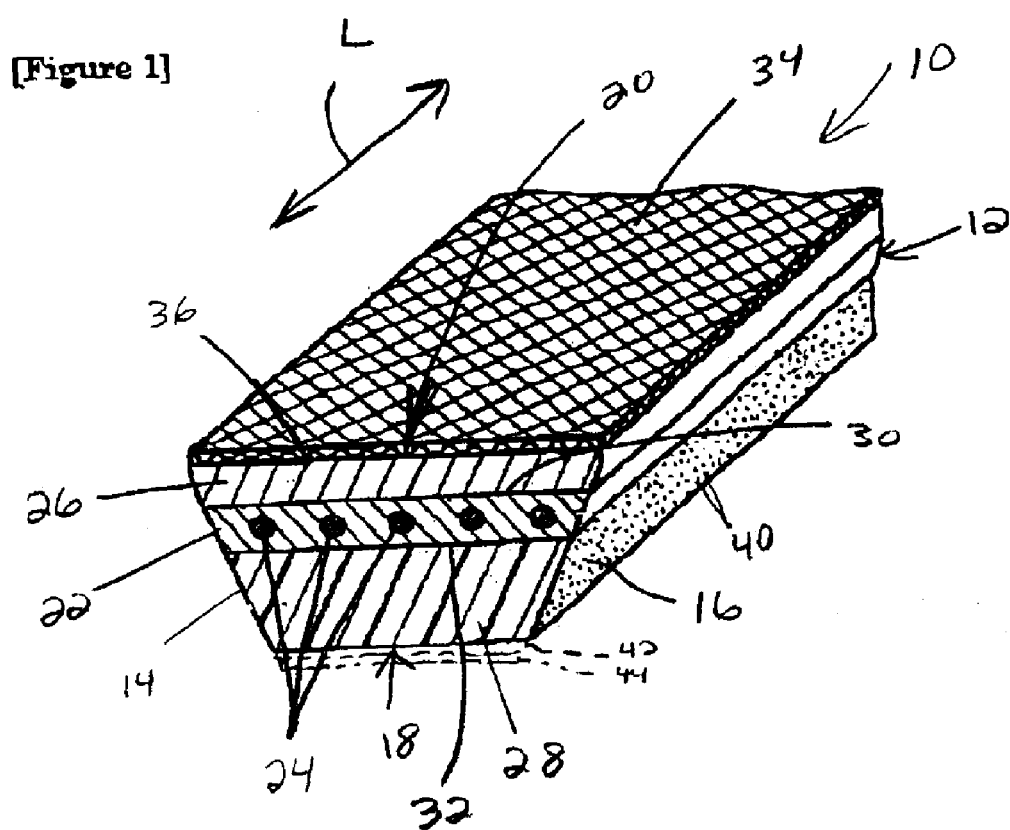
[Figure 1]
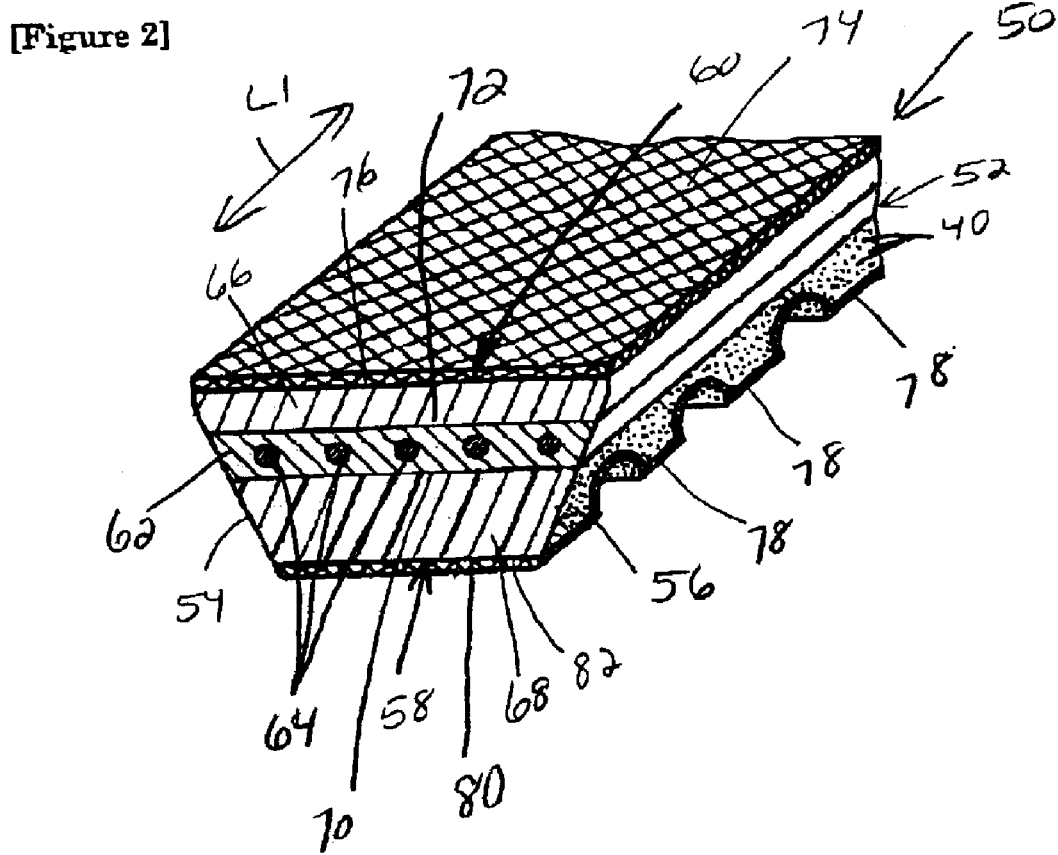
[Figure 2]

[Figure 3]
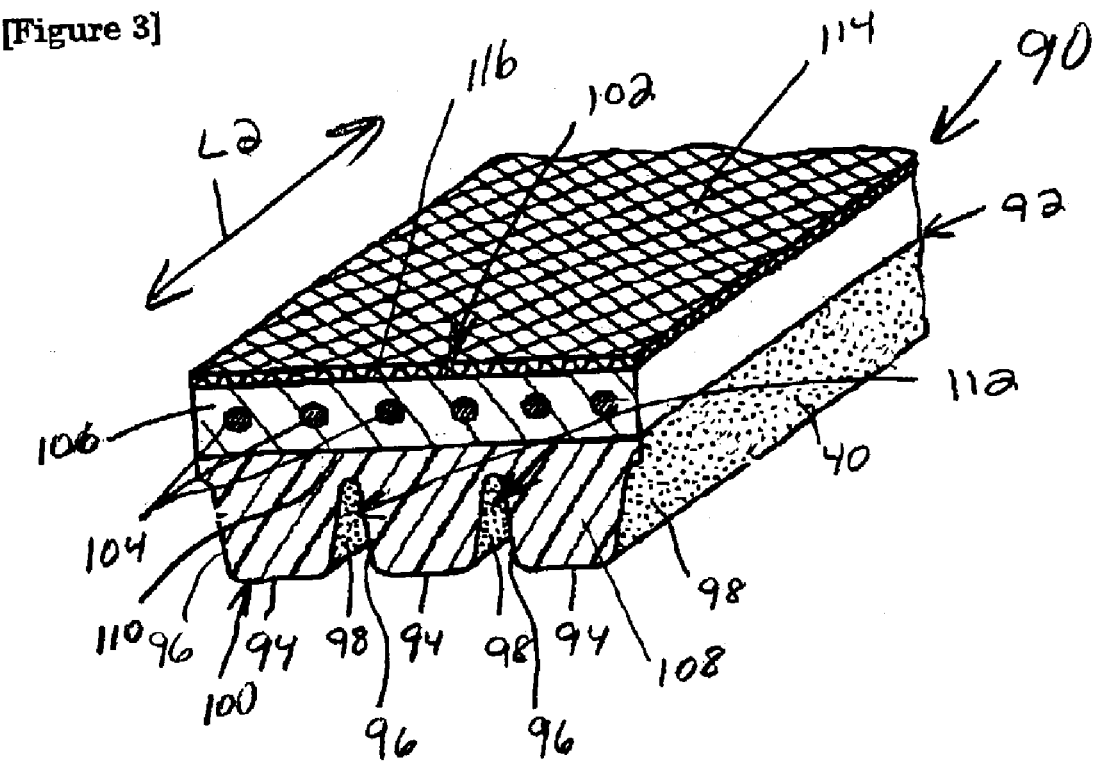
[Figure 4]
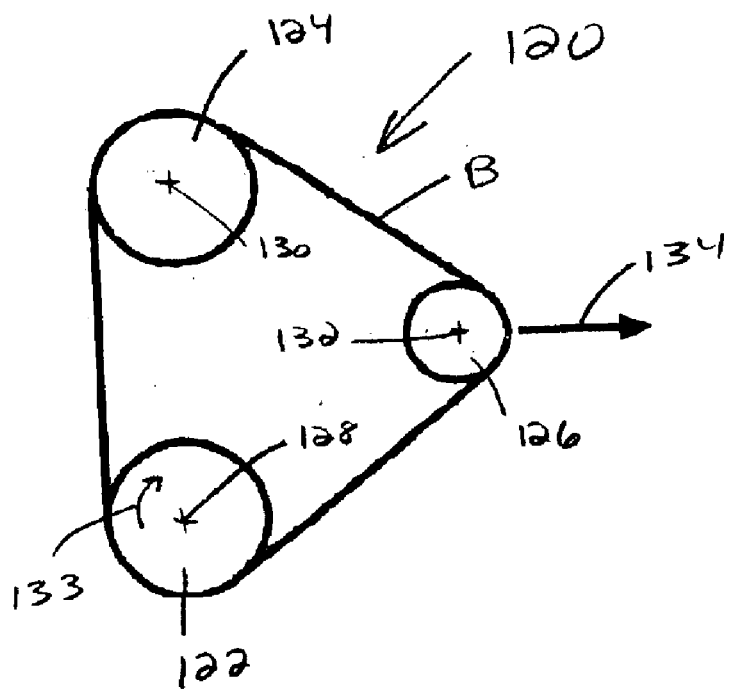

[Figure 5]
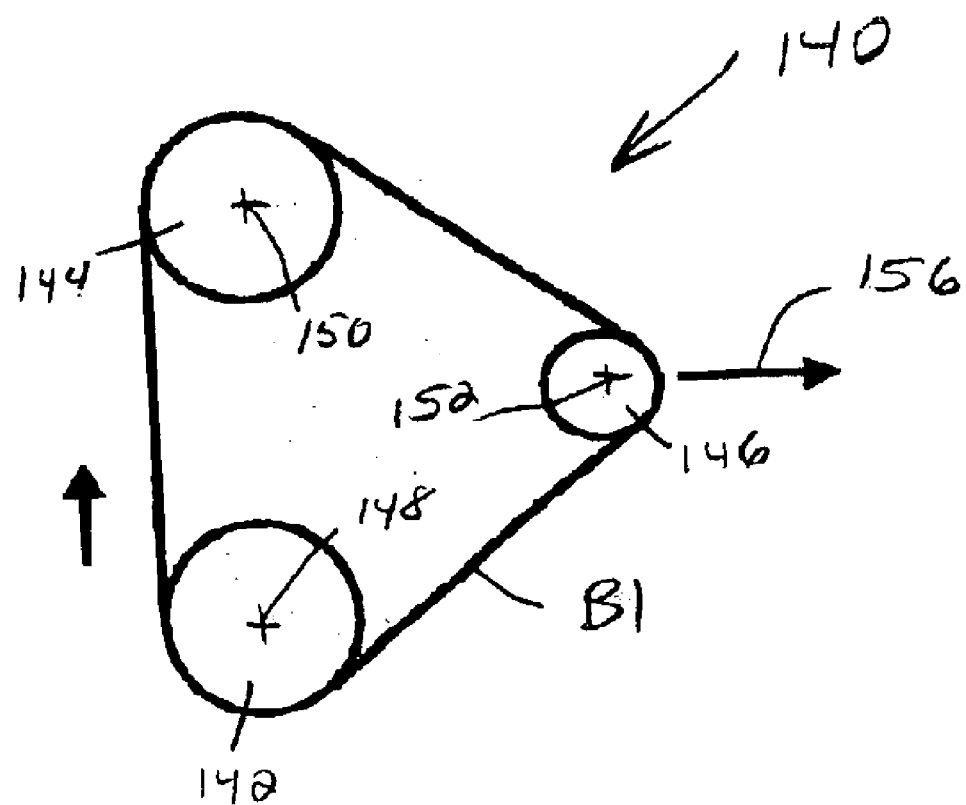

POWER TRANSMISSION BELT

BACKGROUND OF THE INVENTION

1. Field of the Invention

This invention relates to power transmission belts and, more particularly, to a power transmission belt having a body with short fibers embedded therein.

2. Background Art

It is known to improve the abrasion resistance of power transmission belts, such as V-belts and V-ribbed belts, by adding short, reinforcing fibers to a rubber component defining at least a part of the belt. The fibers are typically added to a rubber layer in the compression section of the belt. As one example, a V-belt is disclosed in Japanese Patent No. 3,113,599 with a compression rubber layer having short nylon and Vinylon™ fibers embedded therein. Japanese Patent Document No. JP-B-5-63656 discloses a V-belt with short reinforcing aramid fibers embedded therein. Japanese Patent Document No. JP-B-7-81609 discloses a V-ribbed belt with a compression rubber layer having short nylon and aramid fibers embedded therein.

It is well known that poly-p-phenylene benzobisoxazole fibers have excellent strength and elasticity. As shown in Japanese Patent Document JP-A-11-348512, poly-p-phenylene benzobisoxazole short fibers have been used in rubber compositions in automobile tires. To the knowledge of the inventors herein, poly-p-phenylene benzobisoxazole fibers have not been used in a rubber composition that is incorporated into a power transmission belt to contribute to the performance thereof.

Designers of power transmission belts strive to, among other things, develop power transmission belts with good heat and abrasion resistance. Heat and abrasion resistance can be controlled to a certain extent by the selection of rubber components used, for example, in the compression rubber layer of such belts. Additionally, heat and abrasion resistance can be controlled by embedding short, reinforcing fibers in the compression rubber layer. However, with the existing rubber and fiber technology conventionally used, and the severe operating conditions and environments in which power transmission belts are often required to perform, abrasion resistance may not be adequate, as a result of which premature belt failure may occur.

SUMMARY OF THE INVENTION

The invention is directed to a power transmission belt having a body with a length, a width, an inside, and an outside. The body includes a rubber composition. The body further has a plurality of short fibers in the rubber composition. The plurality of short fibers may include a plurality of poly-p-phenylene benzobisoxazole fibers.

The rubber composition may include chloroprene rubber.

In one form, the body has a compression section, with the rubber composition defining at least a part of the compression section. The poly-p-phenylene benzobisoxazole fibers may be embedded in the rubber composition in the compression section.

In one form, the poly-p-phenylene benzobisoxazole fibers have a length from 1–20 mm.

In one form, the poly-p-phenylene benzobisoxazole fibers have a diameter of 1–3 denier.

In one form, the rubber composition has a rubber component and the poly-p-phenylene benzobisoxazole fibers are mixed in the rubber composition in an amount of 1–40 mass parts of poly-p-phenylene benzobisoxazole fibers per 100 mass parts of the rubber component.

The plurality of short fibers may further include a plurality of aramid fibers.

The rubber composition may include carbon black.

In one form, the carbon black has an iodine absorbing capacity of from 40 mg/g–160 mg/g.

The carbon black may be one identified as at least one of FEF, HAF, ISAF, and SAF.

In one form, the carbon block is present in the rubber composition in an amount of 10–60 mass parts of carbon black per 100 mass parts of the rubber component.

The rubber composition may further include a vulcanization accelerator.

In one form, the vulcanization accelerator is N,N'-m-phenylenedimaleimide.

In one form, N,N'-m-phenylenedimaleimide is present in an amount of 0.5 to 10 mass parts per 100 mass parts of the rubber component.

The rubber composition may further include at least one of: a) a filler; b) an antioxidant; and c) a vulcanizing agent.

In one form, the body has at least one load carrying cord extending along the length of the body.

In one form, with the plurality of fibers including a mixture of poly-p-phenylene benzobisoxazole and aramid fibers, the carbon black is present in the rubber composition in an amount of 10–35 mass parts of carbon black per 100 mass parts of the rubber component.

The belt may be a V-belt or a V-ribbed belt.

In one form, the belt has cogs spaced along the length of the body.

DETAILED DESCRIPTION OF THE DRAWINGS

Figure 1:
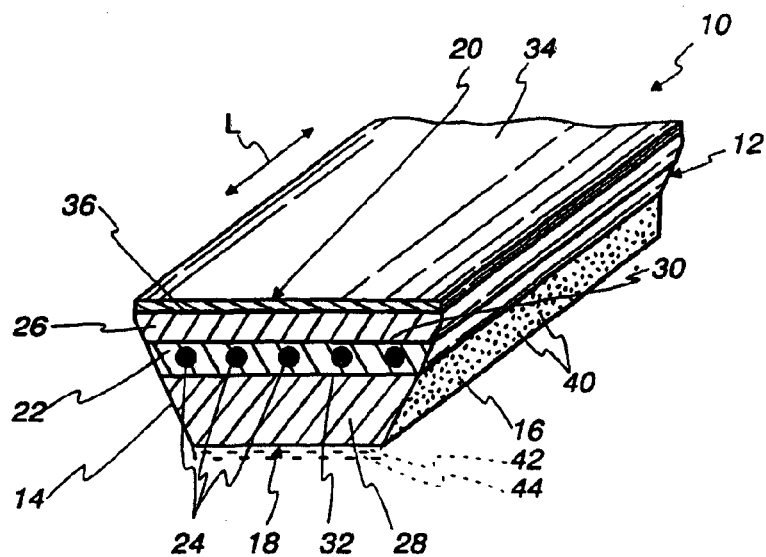
FIG. 1 is a fragmentary, cross-sectional, perspective view of a V-belt, made according to the present invention.

In FIG. 1, one form of power transmission belt, into which the present invention is incorporated, is shown at 10. The power transmission belt 10 is a conventional, cut edge V-belt. The V-belt 10 has a body 12 with a length, extending along the direction indicated by the double-headed arrow L, laterally spaced sides 14, 16, an inside 18, and an outside 20.

The body has a cushion rubber layer 22, within which load carrying cords 24 are embedded so as to extend lengthwise of the belt body 12. A tension rubber layer 26 is adhered on the outside of the cushion rubber layer 22, with a compression rubber layer 28 disposed on the inside of the cushion rubber layer 22. In this embodiment, the tension rubber layer 26 and compression rubber layer 28 are directly adhered to outside and inside surfaces 30, 32, respectively, on the cushion rubber layer 22. A cloth layer 34 is adhered to an outside surface 36 of the body 12 defined by the tension rubber layer 26.

The compression rubber layer 28 is defined by a rubber composition including a chloroprene rubber (CR) component. A plurality of poly-p-phenylene benzobisoxazole (PBO) short fibers 40 is mixed with the chloroprene rubber. The poly-p-phenylene benzobisoxazole fibers have physical properties making these fibers superior, in certain respects, to conventionally used, general-purpose fibers. For example, poly-p-phenylene benzobisoxazole fibers have greater strength and elasticity than do aramid fibers. One process suitable for producing poly-p-phenylene benzobisoxazole fibers, useable in accordance with the present invention, is described in detail in JP-A-08-325840.

The poly-p-phenylene benzobisoxazole fibers 40 are subjected to an adhesion treatment process to increase the tenacity of the bond between the fibers 40 and the rubber component in which they are embedded. As one example of adhesion treatment, the poly-p-phenylene benzobisoxazole fibers 40, in filament form, are initially treated with a solution containing, for example, nitrile rubber-modified epoxy resin and alkylphenol-formaldehyde resin. A subsequent treatment step is then carried out using resorcinol-formaldehyde-latex (RFL). A suitable adhesion treating process is disclosed, for example, in JP-A-2001-322184.

After the adhesion treatment, the filaments are cut to produce the desired fiber length. Preferably, the fibers are cut to a length of 1–20 mm. The preferred fiber diameter is 1–3 denier.

1–40 mass parts of poly-p-phenylene benzobisoxazole short fiber 40 are mixed per 100 mass parts of the rubber component. It has been found that when the amount of the poly-p-phenylene benzobisoxazole fiber 40 is less than 1 mass part, the fibers 40 do not appreciably contribute to abrasion resistance, as when incorporated into the compression layer of a power transmission belt. On the other hand, with the poly-p-phenylene benzobisoxazole short fibers 40 present in an amount greater than 40 mass parts, the fibers 40 may not uniformly disperse in the rubber component, which makes processing of the rubber composition difficult.

The plurality of short fibers 40 may consist of only the poly-p-phenylene benzobisoxazole fibers. Alternatively, the fibers 40 may be a mixture of poly-p-phenylene benzobisoxazole fibers and aramid short fibers. Aramid short fibers suitable for this application are commercially available and sold under the trademarks CORNEX™, NOMEX™, KEVLAR™, TECHNORA™, and TWARON™. The aramid fibers are likewise adhesion treated, as by using an RFL solution. With the poly-p-phenylene benzobisoxazole and aramid fibers mixed, the combined mixture of fiber is present in an amount of 1–40 mass parts, and more preferably 1-35 mass parts, per 100 mass parts of the rubber component, for the same reasons as stated above.

The rubber composition may further include carbon black. The carbon black is normally designated by its iodine absorbing capacity, as measured in accordance with JIS K 6221. More specifically, the carbon black used has an iodine absorption capacity of from 40 mg/g–160 mg/g. If the iodine absorption capacity is less than 40 mg/g, the particle size may be too large, as a result of which insufficient abrasion resistance may be achieved. On the other hand, if the iodine absorption capacity is greater than 160 mg/g, the particle size may be too small, as a result of which the rubber composition is prone to generating a large amount of heat. This may result in a lowering of fatigue resistance for the belt into which the rubber composition is incorporated. The carbon black may be at least one selected from the group identified as FEF, HAF, ISAF, and SAF.

The carbon black is mixed in the rubber composition in an amount of 10–60 mass parts per 100 mass parts of the rubber component. If less than 10 mass parts are used, a desired abrasion resistance may not be achieved. If more than 60 mass parts are used, there may be a significant lowering of the elongation properties of the rubber, after vulcanization. This may detrimentally reduce the resistance of the belt to damage resulting from repeated bending.

The rubber composition further includes N,N'-m-phenylenedimaleimide, which is a vulcanization accelerator. N,N'-m-phenylenedimaleimide is mixed in an amount of 0.5–10 mass parts per 100 mass parts of the rubber component. When present in less than 0.5 mass parts, the cross-linking density may be small, as a result of which there may not be a significant effect in terms of improving abrasion resistance. When the amount is greater than 10 mass parts, there may be a significant lowering in the elongation properties of the vulcanized rubber, which again may reduce the ability of the belt 10 to resist damage resulting from repeated bending.

The vulcanizing agent may be, for example, one or more of sulfur, organic sulfur-containing compounds, organic peroxide, metal oxides, etc. This selection is generally dictated by the particular rubber component.

A filler, softener, antioxidant, auxiliary vulcanizing agent, etc. may be added to and mixed with the rubber component, the short fibers 40, carbon black, vulcanizing agent, and N,N'-m-phenylenedimaleimide. One method of preparing the inventive rubber composition will now be described.

1–40 mass parts of the short fiber 40, and an appropriate amount of auxiliary processing agent, are added to 100 mass parts of rubber and poured into a tightly closed kneader, such as a Banbury mixer. A master batch is kneaded through this process. The kneaded master batch is discharged from the mixer and cooled to from 20–50° C. to prevent scorching. The master batch is then subjected to a final kneading process with predetermined amounts of reinforcing agent, filler, antioxidant, vulcanization accelerator, vulcanizing agent, etc. added. The final kneading may be performed by using a Banbury mixer and open rolls.

Depending upon the type of rubber utilized, there may not be any need to discharge the kneaded master batch to allow cooling thereof. It may be possible to continuously knead a master batch as the remaining components are added. Further, the particular manner of kneading is not limited to that described above, nor to using the described Banbury mixer, rolls, kneader, or extruder. The kneading process may be carried out by virtually any means and process known to those in this industry.

Similarly, the manner of vulcanization of the rubber composition is not critical to the present invention. Vulcanization may be carried out by any method used by those in this industry. As just examples, vulcanization may be carried out using a mold heating method or hot air heating method using a vulcanization apparatus, such as a rotary drum vulcanizing machine and injection molding apparatus.

The load carrying cords 24 can be made from polyester fiber, aramid fiber, and/or glass fiber. The load carrying cords 24 may be made with a primary twist number of 17 to 38/10 cm, with a final twist number of 10–23/10 cm. The total denier for the load carrying cords 24 is preferably between 4,000 and 8,000. If the denier is less than 4,000, the elongation modulus and strength of the cords 24 may become too low. In excess of 8,000, the thickness of the overall belt body 12, incorporating the load carrying cords 24, may be greater than desired. The thickened belt may be prone to flexing fatigue.

The load carrying cords 24 are likewise subjected to an adhesion treatment process, as by using RFL liquid. This improves the adhesion of the load carrying cords 24 to the rubber component in the cushion rubber layer 22. The load carrying cords 24 can be incorporated into a belt to produce a high elongation modulus with the winding pitch for the cords from 1.0 to 1.3 mm. If the winding pitch is less than 1.0 mm, laterally adjacent load carrying cords 24 may contact each other, complicating, or preventing, spiral wrapping of the cords 24 during the manufacturing process. If the pitch is greater than 1.3 mm, the elongation modulus for the belt 10 may become undesirably low.

The cloth layer 34 is a canvas selected from textile, knitted, and non-woven fabric. The fibers defining the canvas may be, for example, natural fibers such as cotton and linen, inorganic fibers such as metal fiber and glass fiber, and organic fiber such as polyamide, polyester, polyethylene, polyurethane, polystyrene, polyfluoroethylene, polyacrylate, polyvinyl alcohol, all-aromatic polyester and aramid.

The cloth layer 34 is adhesion treated by being dipped in an RFL solution. Unvulcanized rubber may be rubbed onto the cloth layer 34. Alternatively, after being dipped in the RFL solution, the cloth layer 34 may be dipped in a soaking solution that is made up of a rubber dissolved in a solvent. Carbon black solution may be mixed with the RFL solution for staining the cloth layer 34 to produce a black color. Alternatively, a known surface-active agent may be added in an amount of 0.1 to 0.5% by mass.

One exemplary method of manufacturing the V-belt 10 of FIG. 1 will now be described. A flat, cylindrical mold (not shown) is wrapped with a single ply of rubberized cotton canvas 34. Thereafter, a layer, which defines a part of the thickness of the cushion rubber layer 22, is wound over the canvas 34. The load carrying cords 24 are then spirally wrapped, followed by the application of another rubber layer which defines the remaining thickness of the cushion rubber layer 22. The compression rubber layer 28, including the embedded fibers 40, is then wrapped around the cushion rubber layer 22 to define a sleeve perform. Optionally, one or more cotton canvas plies 42, 44 can be applied over the compression rubber layer 28. The sleeve preform is thereafter covered with a vulcanization jacket to produce a mold component. The mold component is placed in a vulcanization vessel and vulcanization carried out under controlled temperatures for a predetermined time period. After vulcanization, the sleeve is separated from the mold and cut to predetermined widths. The sides 14, 16 are formed in conventional fashion to produce the desired angle therefor.

Figure 2:
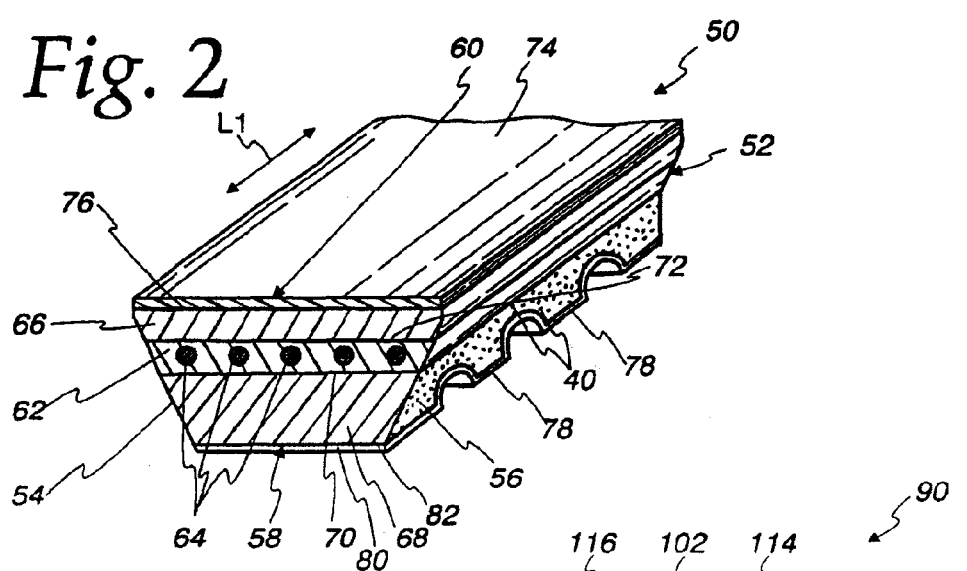
FIG. 2 is a view as in FIG. 1 of another form of power transmission belt, with the present invention incorporated therein, and having cogs formed along the length of the belt.

In FIG. 2, another form of power transmission belt, with the present invention incorporated, is shown at 50. The belt 50 is generally identified as a speed-change belt. The belt 50 has a body 52 with a length, as indicated by the double-headed arrow L1, laterally spaced sides 54, 56, an inside 58, and an outside 60. The body 52 has a cushion rubber layer 62 within which load carrying cords 64 are embedded and extend in a lengthwise direction. A tension rubber layer and compression rubber layer 66, 68 are respectively applied to the inside and outside of the cushion rubber layer 62. In this case, the tension rubber layer 66 and compression rubber layer 68 are applied directly to inside and outside surfaces 70, 72, of the cushion rubber layer 62. A cloth layer 74 is applied to the outside surface 76 of the body 52, which surface 76 is defined by the tension rubber layer 66.

In the compression rubber layer 68, on the inside of the belt body 52, a plurality of cogs 78 are formed at regularly spaced intervals along the length of the belt body 52. A cloth layer 80 is applied to the inside of the belt 50 directly against the exposed inside surface 82 of the compression rubber layer 68. The cogs 78 may be formed utilizing a preformed rubber sheet with a complementary cog configuration. This method is known in the art and disclosed, for example, in JP-A-2002-323091. Other methods may be utilized to form the cog configuration. In the belt 50, the fibers 40 are embedded in at least the rubber component defining the compression rubber layer 68. The composition of each of the other components of the belt 50 may be the same as those corresponding components described with respect to the belt 10, above.

Figure 3:
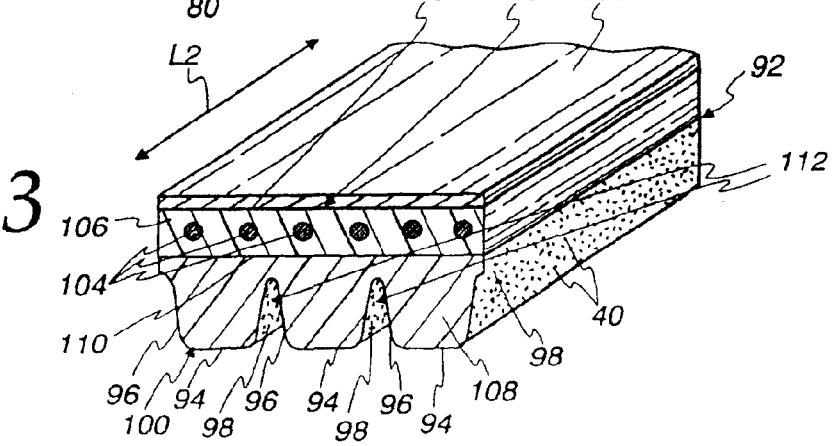
FIG. 3 is a view as in FIGS. 1 and 2 of a V-ribbed belt, with the present invention incorporated therein.

In FIG. 3, a V-ribbed power transmission belt, made according to the present invention, is shown at 90. The belt 90 has a body 92 with a length extending in the direction of the double-headed arrow L2. The body 92 has three, laterally spaced, generally V-shaped ribs 94, each with laterally oppositely facing side surfaces 96, 98. The body 92 further has an inside 100 and an outside 102. Load carrying cords 104 are embedded in a cushion rubber layer 106. A compression rubber layer 108, with the fibers 40 therein, is applied to the inside surface 110 of the cushion rubber layer 106. The compression rubber layer 108 has the same composition as the compression rubber layers 28, 68, described above with respect to the belts 10, 50. The ribs 94 are defined by grooves 112 cut through the compression rubber layer 108, from the inside out. The load carrying cords 104 are made to have high strength and low elongation properties. The load carrying cords 104 may be made from at least one of polyester fiber, aramid fiber, or glass fiber. A rubberized canvas layer 114 is applied to the outside surface 116 of the body 92, which surface 116 is defined by the cushion rubber layer 106.

One exemplary method for manufacturing the V-ribbed belt 90 will now be described. A single ply of rubberized cotton canvas is wrapped around a flat cylindrical mold. One or more additional plies are optionally used and wrapped in the same manner. The cushion rubber layer 106 and load carrying cords 104 are wrapped in turn, after which the compression rubber layer 108 is applied to define a sleeve preform. A jacket is used for vulcanization to provide a mold component, consisting of the mold-mounted sleeve preform and jacket, as previously described. The mold component is placed in a vulcanization vessel and vulcanization carried out, as also previously described. The vulcanized sleeve is then removed from the mold. The ribs 94 are formed using a grinder. The vulcanized sleeve is then cut to produce a desired belt width.

It should be understood that the present invention could be practiced with other belt configurations and with components different than those described for the three exemplary belts 10, 50, 90.

The operation of belts incorporating the prevent invention will now be described with respect to specific testing. Inventive Belt Examples 1–6 and Comparative Examples 1–3 were prepared to carry out comparative testing.

Poly-p-phenylene benzobisoxazole fiber was made from a product manufactured by Toyobo, and sold commercially under the trademark ZYLON™. The ZYLON™ fiber was an HM grade material and cut to lengths of 3 mm. The fiber diameter was 1.7 dtex.

p-Aramid fibers were made from filaments manufactured by Teijin-Twaron, and sold commercially under the trademark TWARON™. Filaments, from which the fibers were cut, had a size of 1,670 dtex/1,000 filaments. The fibers were dipped in an RFL solution, as shown in Table 1, below, and processed at 200° C. for one minute.

TABLE 1

| Compounded Substances | Parts by Mass |
| --- | --- |
| Vinylpyridine latex (40%) | 244.0 |
| Resorcinol | 11.0 |
| 37% Formalin | 16.2 |
| Sodium hydroxide | 0.3 |
| Water | 299.5 |

The processed filaments were cut to produce fibers having a length of 3 mm and a diameter of 1.7 dtex. Rubber compositions, as shown in Table 1, were combined with the resulting short fibers.

TABLE 2

ALL COMPONENTS IDENTIFIED IN MASS PARTS

|  | INVENTIVE EXAMPLES | | | | | | COMPARATIVE EXAMPLES | | |
|---|---|---|---|---|---|---|---|---|---|
|  | 1 | 2 | 3 | 4 | 5 | 6 | 1 | 2 | 3 |
| Chloroprene (*1) | 100 | 100 | 100 | 100 | 100 | 100 | 100 | 100 | 100 |
| PBO (*2) | 5 | 30 | 10 | 10 | 10 | 10 | — | 10 | 10 |
| p-Aramid (*3) | — | — | — | — | — | 15 | 15 | — | — |
| Oil of a naphthene type | 5 | 5 | 5 | 5 | 5 | 5 | 5 | 5 | 5 |
| Stearic acid | 1 | 1 | 1 | 1 | 1 | 1 | 1 | 1 | 1 |
| Magnesium oxide | 4 | 4 | 4 | 4 | 4 | 4 | 4 | 4 | 4 |
| Carbon black A (*4) | 40 | 40 | 25 | 40 | — | 30 | 40 | 40 | 40 |
| Carbon black B (*5) | — | — | — | — | 60 | — | — | — | — |
| Antioxidant (*6) | 2 | 2 | 2 | 2 | 2 | 2 | 2 | 2 | 2 |
| Zinc white | 5 | 5 | 5 | 5 | 5 | 5 | 5 | 5 | 5 |
| Vulcanization accelerator A (*7) | 0.25 | 0.25 | 0.25 | 0.25 | 0.25 | 0.25 | 0.25 | 0.25 | 0.25 |
| Vulcanization accelerator B (*8) | 1 | 1 | 1 | 6 | 1 | 1 | 1 | 15 | — |

(*1) Denka Chloroprene M40, manufactured by Denki Kagaku Kogyo
(*2) ZYLON ™, manufactured by Toyobo
(*3) TWARON ™, manufactured by Teijin Twaron
(*4) ISAF (iodine absorbing capacity: 121 mg/g)
(*5) FEF (iodine absorbing capacity: 43 mg/g)
(*6) Octylated diphenylamine
(*7) 2-Mercaptoimidazoline
(*8) N,N'-m-phenylenedimaleimide The compositions were kneaded in a Banbury mixer and formed into a rubber sheet having a 1 mm thickness using cooperating rolls so that the lengths of the fibers were oriented generally in the direction of extrusion. The resulting sheet was placed in a mold and vulcanized at 153° C. for 20 minutes. The physical properties of the resulting rubber compound were then measured. Abrasion testing, according to DIN, was carried out in accordance with JIS K 6264. Each sample was prepared such that the short fibers were vertically arranged relative to the abraded surface. The results of the measurements are shown in Table 3, below.

TABLE 3

|  | Inventive Examples | | | | | | Comparative Examples | | |
|---|---|---|---|---|---|---|---|---|---|
|  | 1 | 2 | 3 | 4 | 5 | 6 | 1 | 2 | 3 |
| Parallel tensile strength (MPa) | 16.8 | 31.4 | 16.6 | 21.7 | 19.8 | 27.2 | 15.7 | * | 15.1 |
| Rectangular tensile strength (MPa) | 14.5 | 9.5 | 12.8 | 15.3 | 16.9 | 10.3 | 11.1 | * | 9.8 |
| Tensile strength ratio (parallel/rectangular) | 1.16 | 3.31 | 1.30 | 1.42 | 1.17 | 2.64 | 1.41 | * | 1.54 |
| Rectangular shear ductility (%) | 456 | 162 | 417 | 289 | 150 | 292 | 328 | * | 512 |
| DIN Abrasion (%) | 0.077 | 0.024 | 0.055 | 0.043 | 0.051 | 0.045 | 0.082 | * | 0.251 |
| Time of breakage from running the V-belt (hrs.) | 190 | 191 | 211 | 200 | 198 | 193 | 120 | — | 48 |
| Time of crack generation from running the V-ribbed belt (hrs) | 341 | 263 | 334 | 270 | 269 | 321 | 310 | — | 24 |

*kneading impossible

V-belts B (FIG. 4) were made using the above-described rubber compositions. A single ply, rubberized cotton canvas was wrapped around a flat, cylindrical mold, followed by the application of the cushion rubber layer and load carrying cords. Thereafter, the compression rubber layer and three plies of cotton canvas were applied. The resulting sleeve preform was covered with a jacket for vulcanization to produce a mold component. The mold component was placed in a vulcanization vessel and vulcanized at 153° C. for 20 minutes. The sleeve was then separated and cut with an outer width of 10.7 mm. The side surfaces were formed at 36° angles. The resulting V-belts B had a 900 mm length.

Figure 4:
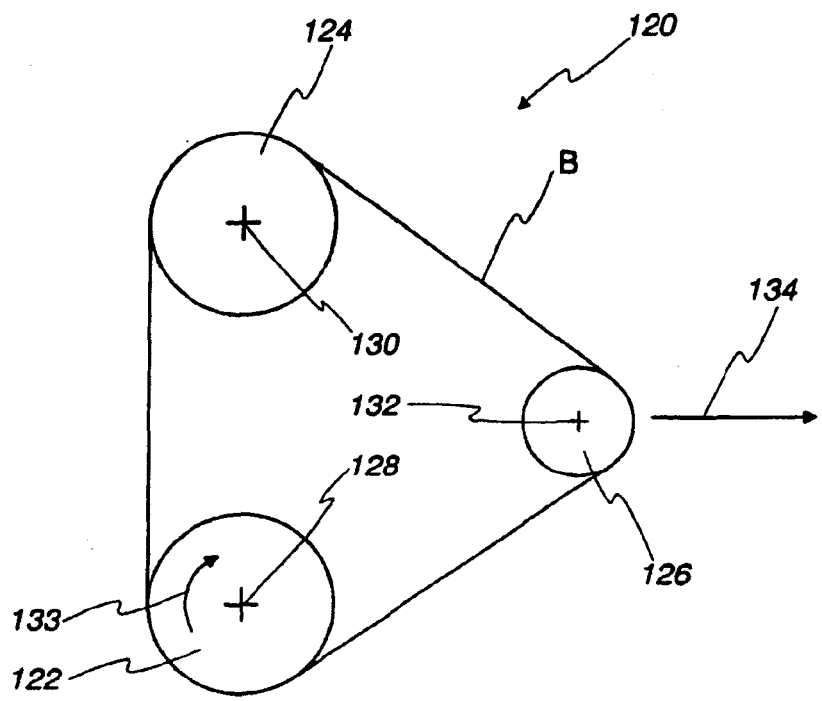
FIG. 4 is a schematic representation of a dynamic test system for determining the heat resistance of a V-belt.

Each of the belts B was run in a test system as shown at 120 in FIG. 4. The belts B were trained around a drive pulley 122, a driven pulley 124 and a tensioning pulley 126. The pulleys 122, 124, 126 were driven around parallel axes 128, 130, 132, consecutively. The drive and driven pulleys 122, 124 had a 120 mm diameter. The tensioning pulley 126 had a 65 mm diameter. The drive pulley was operated at 4900 rpm in the direction of the arrow 133, with a load of 8 ps on the driven pulley 124. A tension was applied to the belts B through the tensioning pulley 126, urged in the direction of the arrow 134 against the inside of the belts B with a force of 735N. The belts B were run at atmospheric temperature of 85° C. until the belts B broke, at which time the heat resistance was evaluated. The results are shown in Table 3, above.

V-ribbed belts B1 (FIG. 5) were made by winding components around a flat cylindrical mold. Two plies of rubberized cotton canvas were first applied, after which the cushion rubber layer and load carrying cords were wrapped. The compression rubber layer was then applied to produce a sleeve preform. A jacket was placed around the sleeve preform to produce a mold component, which was placed in a vulcanization vessel and vulcanized at 153° C. for 20 minutes. The vulcanized sleeve was then removed from the mold and ground to produce the individual ribs in the compression rubber layer. The sleeve was then cut to the desired belt width. The resulting belts B1 were K type belts, each with three ribs. Each belt B1 had a length of 1,100 mm.

Figure 5:
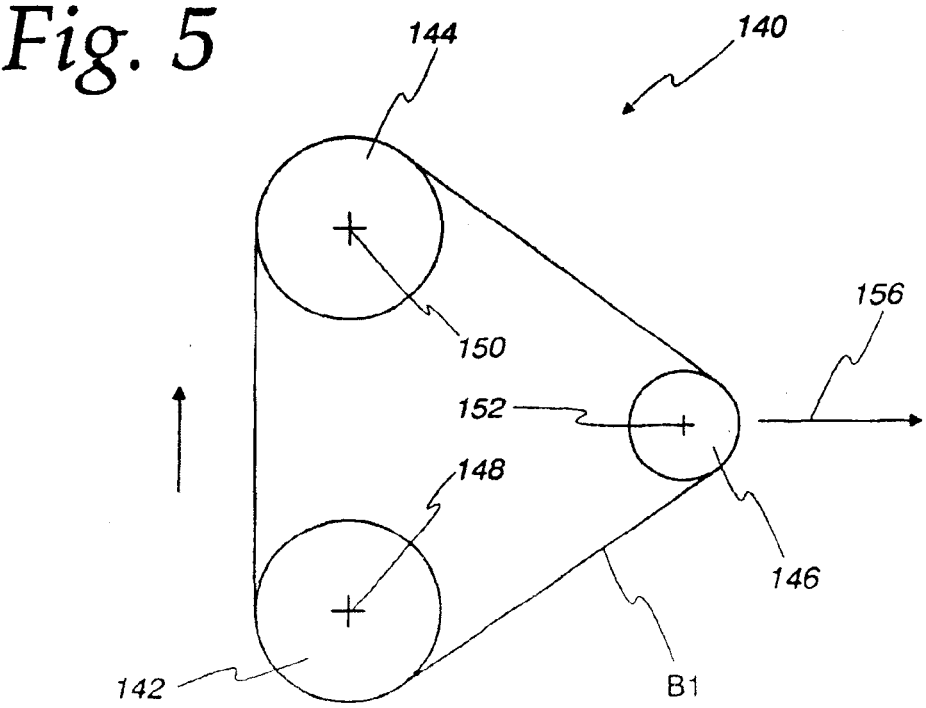
FIG. 5 is a view of a dynamic test system, as in FIG. 4, for determining heat resistance of a V-ribbed belt.

The V-ribbed belts B1 were operated on a test system as shown at 140 in FIG. 5. The test system consisted of a drive pulley 142, a driven pulley 144, and a tensioning pulley 146. The pulleys 142, 144, 146 were rotated around parallel axes 148, 150, 152. The drive pulley 142 and driven pulley 144 each had a diameter of 120 mm, with the tensioning pulley 146 having a diameter of 45 mm. The drive pulley was operated at 4900 rpm to advance the belts B1 in the direction of the arrow 154. A load of 12 ps was applied to the driven pulley 144. A tension was applied to the running belts B1 through the tensioning pulley, pressed against the inside of the belts B1 with a force of 85N/3 ribs in a direction as indicated by the arrow 156.

The belts B1 were operated on the test system 140 at an atmospheric temperature of 85° C. The time was measured at which cracking reached the load carrying cords, at which point heat resistance was evaluated. The results are shown in Table 3, above.

As seen in Table 3, abrasion and heat resistance for Inventive Example 1 were superior to those for Comparative Example 1, in spite of the lesser overall amount of fiber utilized, due to the contribution of the poly-p-phenylene benzobisoxazole fiber, as opposed to the p-Aramid short fiber used in Comparative Example 1.

In Inventive Examples 2–5, the DIN abraded amount lowered and abrasion resistance was improved compared with Comparative Example 1, due to the contribution of the poly-p-phenylene benzobisoxazole short fiber. Even when the poly-p-phenylene benzobisoxazole short fibers were blended with p-Aramid short fibers, as in Inventive Example 6, there was improvement in the DIN abraded amount and in the durable life of the belt.

In Comparative Example 2, with the addition of more than 10 mass parts of maleamide, premature vulcanization took place during kneading, making the kneading impossible.

In Comparative Example 3, no maleamide was added. The DIN abraded amount was very large, and it was noted that there was a problem with abrasion resistance.

From these results, it can be seen that, by practicing the present invention, it is possible to produce power transmission belts with excellent heat and abrasion resistance.

The foregoing disclosure of specific embodiments is intended to be illustrative of the broad concepts comprehended by the invention.

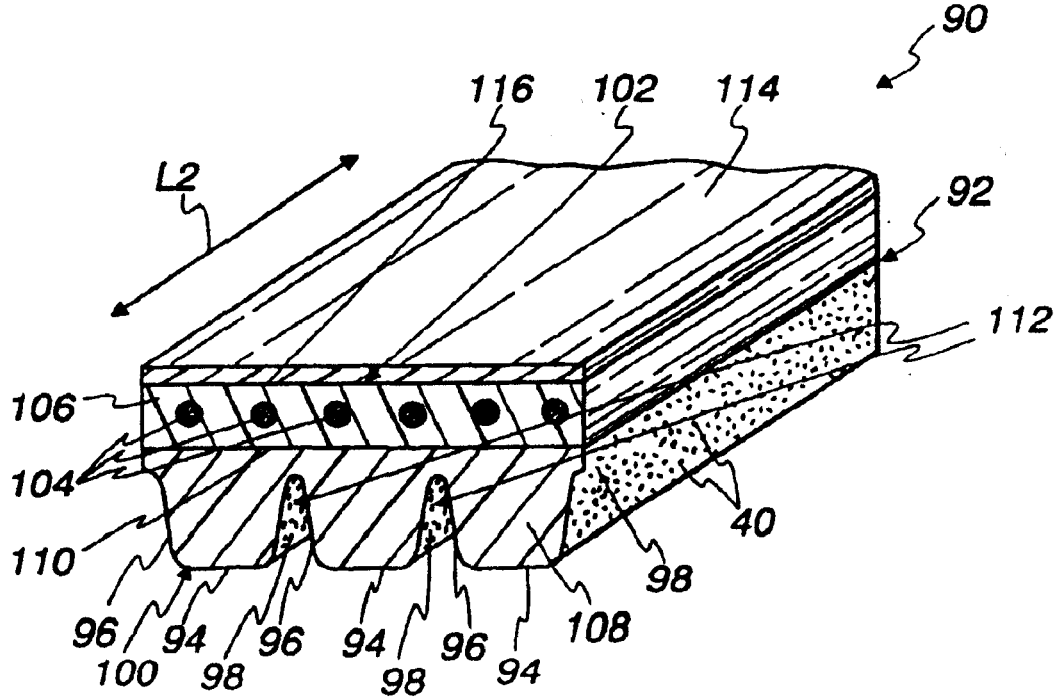

What is claimed is:

1. A power transmission belt comprising:
a body having a length, a width, an inside, and an outside, the body comprising a rubber composition,
the body further comprising a plurality of short fibers in the rubber composition,
the plurality of short fibers comprising a plurality of poly-p-phenylene benzobisoxazole fibers.

2. The power transmission belt according to claim 1 wherein the rubber composition comprises chloroprene rubber.

3. The power transmission belt according to claim 1 wherein the body has a compression section, the rubber composition defines at least a part of the compression section, and the poly-p-phenylene benzobisoxazole fibers are embedded in the rubber composition in the compression section.

4. The power transmission belt according to claim 1 wherein the poly-p-phenylene benzobisoxazole fibers have a length from 1–20 mm.

5. The power transmission belt according to claim 4 wherein the poly-p-phenylene benzobisoxazole fibers have a diameter of 1–3 denier.

6. The power transmission belt according to claim 1 wherein the rubber composition comprises a rubber component, the poly-p-phenylene benzobisoxazole fibers are mixed in the rubber composition in an amount of 1–40 mass parts of poly-p-phenylene benzobisoxazole fibers per 100 mass parts of the rubber component.

7. The power transmission belt according to claim 1 wherein the plurality of short fibers further comprises a plurality of aramid fibers.

8. The power transmission belt according to claim 1 wherein the rubber composition comprises carbon black.

9. The power transmission belt according to claim 8 wherein the carbon black comprises carbon black with an iodine absorbing capacity of from 40 mg/g–160 mg/g.

10. The power transmission belt according to claim 8 wherein the carbon black comprises one identified as at least one of FEF, HAF, ISAF, and SAF.

11. The power transmission belt according to claim 8 wherein rubber composition comprises a rubber component and the carbon black is present in the rubber composition in an amount of 10–60 mass parts of carbon black per 100 mass parts of the rubber component.

12. The power transmission belt according to claim 1 wherein the rubber composition comprises a vulcanization accelerator.

13. The power transmission belt according to claim 12 wherein the vulcanization accelerator comprises N,N'-m-phenylenedimaleimide.

14. The power transmission belt according to claim 13 wherein the rubber composition comprises a rubber component and N,N'-m-phenylenedimaleimide is present in an amount of 0.5–10 mass parts per 100 mass parts of the rubber component.

15. The power transmission belt according to claim 1 wherein the rubber composition further comprises at least one of: a) a filler; b) an antioxidant; and c) a vulcanizing agent.

16. The power transmission belt according to claim 1 wherein the body further comprises at least one load carrying cord extending along the length of the body.

17. The power transmission belt according to claim 16 wherein the body has a compression section, the rubber composition defines at least a part of the compression section, the rubber composition comprises a rubber component, and the poly-p-phenylene benzobisoxazole fibers are mixed in the rubber composition in an amount of 1–40 mass parts of poly-p-phenylene benzobisoxazole fibers per 100 mass parts of the rubber component.

18. The power transmission belt according to claim 17 wherein the rubber composition comprises carbon black present in the rubber composition in an amount of 10–60 mass parts of carbon black per 100 mass parts of the rubber component.

19. The power transmission belt according to claim 18 wherein the carbon black comprises carbon black with an iodine absorbing capacity of from 40 mg/g–160 mg/g.

20. The power transmission belt according to claim 19 wherein the rubber composition comprises a vulcanization accelerator.

21. The power transmission belt according to claim 20 wherein the vulcanization accelerator comprises N,N'-m-phenylenedimaleimide.

22. The power transmission belt according to claim 21 wherein N,N'-m-phenylenedimaleimide is present in an amount of 0.5–10 mass parts per 100 mass parts of the rubber component.

23. The power transmission belt according to claim 17 wherein the rubber component comprises chloroprene rubber.

24. The power transmission belt according to claim 7 wherein the body further comprises at least one load carrying cord extending along the length of the body.

25. The power transmission belt according to claim 24 wherein the rubber composition comprises a rubber component and the plurality of poly-p-phenylene benzobisoxazole and aramid fibers are present in the rubber composition in a combined amount of 1–40 mass parts of poly-p-phenylene benzobisoxazole and aramid fibers per 100 mass parts of the rubber component.

26. The power transmission belt according to claim 25 wherein the rubber composition comprises carbon black present in the rubber composition in an amount of 10–35 mass parts of carbon black per 100 mass parts of the rubber component.

27. The power transmission belt according to claim 26 wherein the carbon black comprises carbon black with an iodine absorbing capacity of from 40 mg/g–160 mg/g.

28. The power transmission belt according to claim 27 wherein the rubber composition comprises a vulcanization accelerator.

29. The power transmission belt according to claim 28 wherein the vulcanization accelerator comprises N,N'-m-phenylenedimaleimide present in an amount of 0.5–10 mass parts per 100 mass parts of the rubber component.

30. The power transmission belt according to claim 29 wherein the rubber component comprises chloroprene rubber.

31. The power transmission belt according to claim 1 wherein the power transmission belt is a V-belt.

32. The power transmission belt according to claim 31 wherein the power transmission belt is a V-ribbed belt.

33. The power transmission belt according to claim 1 wherein the body has cogs spaced along the length of the body.

* * * * *

UNITED STATES PATENT AND TRADEMARK OFFICE
CERTIFICATE OF CORRECTION

PATENT NO. : 6,866,922 B2
DATED : March 15, 2005
INVENTOR(S) : Takehara et al.

It is certified that error appears in the above-identified patent and that said Letters Patent is hereby corrected as shown below:

The title page, showing the print figure should be deleted, and replaced with the attached amended title page.

Drawing sheets, consisting of Fig. 1-5, should be deleted and replaced with the drawing sheets, consisting of Fig. 1-5, as shown on the attached pages.

Signed and Sealed this

Twenty-ninth Day of November, 2005

JON W. DUDAS
*Director of the United States Patent and Trademark Office*

(12) United States Patent
Takehara et al.

(10) Patent No.: US 6,866,922 B2
(45) Date of Patent: Mar. 15, 2005

(54) POWER TRANSMISSION BELT

(75) Inventors: Takeshi Takehara, Hyogo (JP); Hitoshi Hasaka, Kobe (JP); Takeshi Kimura, Kobe (JP); Yasutsugu Kunihiro, Hyogo (JP); Toshimichi Takada, Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 44 days.

(21) Appl. No.: 10/400,274

(22) Filed: Mar. 27, 2003

(65) Prior Publication Data
US 2004/0005447 A1 Jan. 8, 2004

(30) Foreign Application Priority Data
Mar. 28, 2002 (JP) .................................. 2002-091153

(51) Int. Cl.$^7$ .................................................. B32B 25/10
(52) U.S. Cl. .............. 428/295.1; 428/375; 428/364; 428/367; 428/396; 428/332; 428/401; 474/161; 474/268; 474/263; 474/271

(58) Field of Search ........................... 428/375, 364, 428/367, 396, 401, 332, 295.1; 474/161, 266, 268, 263, 207, 271

(56) References Cited
U.S. PATENT DOCUMENTS
5,891,561 A * 4/1999 Kinoshita et al. ......... 428/295.1

FOREIGN PATENT DOCUMENTS
| JP | 3113599 | 5/1991 |
| JP | B-5-63656 | 9/1993 |
| JP | B-7-81609 | 9/1995 |

* cited by examiner

Primary Examiner—Merrick Dixon
(74) Attorney, Agent, or Firm—Wood, Phillips, Katz, Clark & Mortimer

(57) ABSTRACT

A power transmission belt having a body with a length, a width, an inside, and an outside. The body includes a rubber composition. The body further has a plurality of short fibers in the rubber composition. The plurality of short fibers may include a plurality of poly-p-phenylene benzobisoxazole fibers.

33 Claims, 3 Drawing Sheets